United States Patent [19]
Sano et al.

[11] 3,977,888
[45] Aug. 31, 1976

[54] INORGANIC COATING COMPOSITIONS WITH ALKALI SILICATE

[75] Inventors: Ryuichi Sano; Nobuhiro Kurano; Hiroshi Iwai; Iwao Momiyama, all of Amagasaki, Japan

[73] Assignee: Kansai Paint Company, Ltd., Japan

[22] Filed: Nov. 15, 1974

[21] Appl. No.: 524,228

Related U.S. Application Data

[63] Continuation-in-part of Ser. No. 274,419, July 24, 1972, abandoned, which is a continuation-in-part of Ser. No. 94,151, Dec. 1, 1970, abandoned.

[30] Foreign Application Priority Data

Dec. 8, 1969 Japan.................................. 44-98498

[52] U.S. Cl..................................... 106/74; 106/84; 427/344
[51] Int. Cl.²............................................ C09D 1/04
[58] Field of Search ................. 106/74, 84; 427/344

[56] References Cited
UNITED STATES PATENTS

| | | | |
|---|---|---|---|
| 2,807,552 | 9/1957 | Robinson et al...................... | 106/74 |
| 2,944,919 | 7/1960 | Morris et al. ......................... | 106/84 |
| 2,998,328 | 8/1961 | Munger et al. ....................... | 106/84 |
| 3,130,061 | 4/1964 | McMahon et al. ................... | 106/84 |
| 3,258,346 | 6/1966 | Fisher ................................... | 106/84 |
| 3,492,137 | 1/1970 | Iler....................................... | 106/74 |
| 3,712,941 | 1/1973 | Myers ................................... | 106/74 |
| 3,721,574 | 3/1973 | Schneider et al..................... | 106/84 |
| 3,793,055 | 2/1974 | Shodai et al. ........................ | 106/74 |

*Primary Examiner*—J. Poer
*Attorney, Agent, or Firm*—Ostrolenk, Faber, Gerb & Soffen

[57] ABSTRACT

Inorganic coating compositions with alkali silicate comprising a viscous aqueous suspension which is obtained by heating above 50° C. the mixture comprising an aqueous 10–50 weight percent solution of alkali silicate and 5–300 weight percent (vs. the solid component in said 10–50 weight percent aqueous solution) of amorphous silica powder hardenable upon application of a hardener solution comprising a surface tension reducing agent and an aqueous solution of at least one compound selected from phosphoric acid, phosphates, chlorides, sulfates, nitrates, fluorosilicates and ammonium persulfate.

7 Claims, No Drawings

INORGANIC COATING COMPOSITIONS WITH ALKALI SILICATE

This is a continuation-in-part of application Ser. No. 274,419 filed July 24, 1972, now abandoned, which was a continuation-in-part of application Ser. No. 94,151 filed Dec. 1, 1970, now abandoned.

This invention relates to inorganic coating compositions comprising alkali silicate as a film-forming material. More particularly, this invention relates to the compositions with alkali silicate comprising an inorganic coating composition (a) and a hardener (b). Said coating composition (a) is prepared by mixing and dispersing appropriate filler and/or pigments into a polymeric silicate as a main binder obtained by heating a mixture of alkali silicate and amorphous silica powder. The hardener (b) is an aqueous solution containing at least one of phosphoric acid, phosphates, chlorides, ammonium sulfate, nitrates, fluorosilicates and ammonium persulfate with addition of a surface tension reducing agent of fluorocarbon or silicone type.

The purpose of the present invention is to provide a colored inorganic coating material for various materials, such as metals, asbestos-cement sheets, concrete products, and wood products, with excellent adherence, high crack resistance, fire resistance, weather resistance, and high gloss.

Heat resistant and radiation resistant paints described in the technical reports of NASA and inorganic zinc-rich paints are currently known inorganic coating compositions which make use of alkali silicate as a main binder of coating.

These inorganic compositions theoretically provide coating films with excellent heat resistance, fire resistance, and solvent resistance because of their inorganic characteristics. However, it is very difficult to make these coating compositions which exhibit their excellent inorganic characteristics because the alkali silicate film formed is very brittle and lacks adherence to substrates. The materials hardly adhere to various wood products, such as plywood, and asbestos-cement sheets, concrete products except some coatings containing zinc powder used as corrosion resistant paints for metals. The inorganic coating compositions of the present invention make use of an aqueous polymeric silicate solution as a binder which has a particular viscoelastic property, so the compositions of the present invention have excellent applicability to various materials such as asbestos-cement sheets, concrete products and wood products like plywood and give epoch-making inorganic coatings.

The present inventors found that silicate compositions with particular viscoelastic properties are obtained when a mixture of an aqueous solution of alkali silicate and amorphous silica is heated, and succeeded in the formation of inorganic coating compositions having excellent applicability to various materials other than steel by the use of the silicate compositions. An example will be given below. Amorphous silica is added to an aqueous solution of alkali silicate and then stirred at 50°–100°C. until the viscosity at least doubles in value. The viscosity of the mixed composition rises gradually until a highly viscous material is obtained. When this product is diluted with water and filtrated, it is found that the amount of amorphous silica in the residue is smaller than the amount of the silica originally added to the solution. It is estimated that the amount of the silica in the form of silicate dissolved into the aqueous alkali silicate solution is increased by stirring and heating the mixed composition. It is also found that a highly elastic intermediate film is obtained in the course of drying when the mixed composition is coated onto the surface of glass, steel, and plywood, and then dried, at room temperature. When the heating and stirring are not performed, dissolution of the amorphous silica is not noticed even after a long time. When silica other than amorphous silica is used, dissolution of silica and the increase of viscosity are not found even when the mixed composition is heated and stirred. Consequently, it is clear that the polymeric silicate used in the compositions of the present invention is formed under definite conditions in a limited region. A practical embodiment is now given below. To an aqueous solution containing 1 weight part (as solid) of various alkali silicates, 1.5 weight part of amorphous silica powder is added. This mixture is stirred for about 6 hours at 50°–100°C. The results of measurement of viscosity and the amount of dissolved silicate in the mixed composition were as follows:

When sodium silicate solution was used:

| | |
|---|---|
| Without heating and stirring: | |
| Viscosity | 325 centipoises |
| Amount of dissolved silica in the form of silicate | 20 % |
| With heating and stirring: | |
| Viscosity | 9300 centipoises |
| Amount of dissolved silica in the form of silicate | 30 % |
| When potassium silicate solution was used: | |
| Without heating and stirring: | |
| Viscosity | 280 centipoises |
| Amount of dissolved silica in the form of silicate | 20 % |
| With heating and stirring: | |
| Viscosity | 10,000 centipoises |
| Amount of dissolved silica in the form of silicate | 30 % |
| When lithium silicate solution was used: | |
| Without heating and stirring: | |
| Viscosity | 600 centipoises |
| Amount of dissolved silica in the form of silicate | 20 % |
| With heating and stirring: | |
| Viscosity | 1200 centipoises |
| Amount of dissolved silica in the form of silicate | 24 % |

It is noticed that the viscosity of the solution after heating and stirring is respectively about twice, 28 times, and about 35 times that of the solution without stirring and heating, for lithium silicate, sodium silicate and potassium silicate, respectively. It is also noticed that there is a large difference in the amount of dissolved silicate in the aqeuous solution obtained by filtrating the composition.

Although the cause of such a difference has not been clear, it is estimated that chemically and physically complicated changes, including the formation of polymeric silicate ion micelles, take place in the mixed solution during heating and stirring. For example, Nauman, R. V. and Debye, P., Journal of Physical Chemistry 55, 1 (1951) and Journal of Physical Chemistry 65, 5 (1961), and Brady, A. P. and Brown, G. G., Journal Colloid Science 8, 256 (1953) state that the results of measurements of weight average molecular weight by light scattering indicate that the amount of polymeric silicate ion micelles in the aqueous alkali silicate solution increases with the increase of the amount of silicate.

According to the results of these well known investigations, the changes that take place in the reaction are the same as those which take place in the aqueous solution of polymeric silicate of the present invention. The composition described above must be multicomponent comprising a mixture of monomeric silicate ion, polymeric silicate ion micelle, incompletely soluble amorphous silica or its hydrate, and amorphous silica with adsorbed silicate ions. Consequently, it is clear that the compositions have the particular viscosity at least in the presence of water. The fusion method and the wet method are similar to this method. According to the fusion method, sodium silicate glass obtained by melting a mixture of silica and sodium carbonate is dissolved with hot water and the insoluble residue is filtrated off to give an aqueous solution of alkali silicate. According to the wet method, a mixture of silica powder and sodium hydroxide is dissolved in water by heating under pressure, and then insoluble matter is filtrated off to give an aqueous solution of alkali silicate. These methods produce aqueous alkali silicate solutions which are completely different from the present invention in the following points: Namely, the aqueous alkali silicate solution obtained by the fusion method and the wet method described above does not include polymeric silicate ion micelle but is present in the form of monomeric silicate. Also, these solutions do not include such structure-forming material as incompletely soluble amorphous silica and amorphous silica with adsorbed silicate ions. Therefore, when a solution of these is coated onto a glass sheet, steel plate, asbestos-cement sheet or plywood, and dried, the films form cracks during drying and shows incomplete adherence to the substrate. The applicability to porous materials such as asbestos-cement sheet and plywood is especially unsatisfactory.

In the case of the present invention, the silicate is present as a multicomponent comprising a mixture of monomeric silicate ion, polymeric silicate ion micelle, incompletely soluble amorphous silica or its hydrate, and amorphous silica with adsorbed silicate ions. The silicate content is also high. By the interaction of these dissolved and suspended components, the mixed compositions of the present invention give a highly viscous solution with a particular viscoelastic property. The surface of the amorphous silica, which forms a suspension, is in a partly dissolved state. Moreover, silicate ions are bound to the surface of the amorphous silica physically and chemically, and strengthen the interaction between the amorphous silica as a filler and the silicate as a binder, thus forming a very strong film.

As described above, the present invention is characterized by that amorphous silica powder filler being dissolved in the state of incomplete dissolution in the alkali silicate aqueous solution to form therein an amorphous silica suspension or amorphous silica hydrate suspension having adsorbed polymeric silicate ion micelle and monomeric silicate ions and the alkali silicate film-forming material includes such an amorphous silica powder.

Also, the alkali silicate coating film is hardened by immersing the film into an aqueous solution of hardener or by spraying an aqueous solution of hardener onto the film.

When the coating compositions are coated onto the surface of glass, steel, asbestos-cement sheets, concrete products and plywood, a highly elastic and highly adhesive intermediate film is formed without any formation of cracks because the strain formed during coating is relaxed by its viscoelastic property. The film shows very good leveling property during the drying process, because of its suitable viscosity and surface tension due to the particular viscoelastic property of the mixed composition.

When this film is hardened by immersing the film into an aqueous solution of a hardener, hardening of the film takes place while the accompanying stress in the coating film is uniformly relaxed and local concentration of stress hardly takes place. This is the reason why the adherence, crack resistance and luster are improved.

As such a hardener contains a surface tension reducing agent such as fluorocarbon, the penetration of the hardener takes place more easily and the hardening of the surface and inside becomes uniform, so the crack resistance increases further and the adherence improves.

The hardness of the coating film is very high because of the high silicate content in the hardened film and the intimate interaction of amorphous silica and the binder. It is therefore possible to fully exhibit characteristics such as high weather resistance, chemical resistance, crack resistance, fire resistance and gloss of inorganic films obtained by coating.

The aqueous solution of the mixed composition thus obtained is very stable during storage irrespective of its high silica content. The mixed composition is semi-transparent and easily colored by pigments.

The main film-forming material of the present invention is the viscous aqueous solution obtained by heating 10–50 weight percent alkali silicate solution at above 50°C. after the addition of 5–300 weight percent amorphous silica (against the solid component in the aqueous solution). Preferably, the amount of amorphous silica is 10–170 weight percent. When the amount of amorphous silica is less than 5 weight percent, practically no advantage is found because the effect of the amorphous silica is too small. However, if the amount of silica exceeds 300 weight percent, the mixed composition loses its fluidity and becomes useless as a coating material.

Any alkali metal hydroxides can be used for the present invention. Usually the hydroxides of sodium, potassium, or lithium are used. The molar ratio of silicon dioxide to alkali metal oxide in the alkali silicate is 0.5–15 in the present invention. The most preferable ratio is 1.0–5.0 when sodium or potassium is used as the alkali metal, and 2.0–10.0 for lithium. The viscosity of the aqueous solution of alkali silicate is dependent upon the molar ratio between the alkali metals and silicon dioxide, and concentration of alkali silicate. Aqueous alkali silicate solution can be used when the concentration is between 10 to 50 weight percent. The viscosity of the mixed composition of alkali silicate and amorphous silica powder after heating and stirring is in the range of 1,000 to 15,000 centipoises.

The amorphous silica powder used in the present invention has a particle size of 0.5 to 50 $\mu$ and is prepared by crushing after melting crystalline silica at above 1700°C. and cooling to room temperature. Crystalline silica is inactive and does not dissolve in alkali silicate solution even with heating. Consequently, since it does not form the viscous and highly concentrated polymeric silicate composition, crystalline silica is not suitable for compositions of the present invention.

The aqueous alkali silicate compositions thus obtained are usable as a coating composition. At the same time, it can be used like other well known coating compositions, with coloring materials such as titanium dioxide, zinc oxide, red iron oxide, chromium oxide, carbon black, vermilion, cobalt violet, cobalt blue, cadmium yellow, ochre, etc. It can also be used with the addition of inorganic fillers such as glass fiber, glass powder, mica, talc, and china clay, if necessary.

The coating composition thus obtained is coated on various materials such as asbestos-cement sheets, gypsum board, particle board, cement block, plywood, steel plate, aluminum plate, concrete wall, and mortar wall by conventional methods, for example, spraying, brushing and roller coating to a thickness of 30–200 $\mu$. The coating is then heated to 80°–100°C., if necessary, and then immersed in a hardener solution immediately.

In the case of field work, the hardener solution is sprayed to harden the coating after the coating becomes dry to a finger touch. The hardener used for the practice of the present invention is a surface tension reducing agent and an aqueous solution containing one or more compounds chosen from a group comprising phosphoric acid, phosphates, chlorides, ammonium sulfate, nitrates, fluorosilicates and ammonium persulfate.

Examples of the phosphates are ammonium phosphate and metal primary phosphates with or without hydrated water having the following general formula:

$$MiO_j . mP_2O_5$$

wherein M is a metal selected from the group consisting of the metals of group I, group II and group III in periodic table, and $m$ is 0.25 to 4, $i$ is 1 or 2, $j$ is 1 to 3, and the ratio of $i$ to $j$ is determined according to the valency of M. Examples of the chlorides are ammonium chloride and metal chlorides of a metal selected from group II, group III and group IV in periodic table and a metal selected from transitional metal of other groups in periodic table. Examples of the nitrates are ammonium nitrate and metal nitrates of a metal selected from group II, group III and group IV in periodic table and a metal selected from transitional metals of other groups in periodic table. Examples of fluorosilicates are lead hexafluorosilicate, zinc hexafluorosilicate, calcium hexafluorosilicate, sodium hexafluorosilicate and potassium hexafluorosilicate.

The concentration of the aqueous solution should be more than 2 weight % or preferably more than 15 weight %. Into the aqueous solution is added 0.01–1.0 weight % or preferably 0.03–0.5 weight % of surface tension reducer of fluorocarbon or silicone to form the hardener solution. When this hardener solution is applied, hardening takes place rapidly. The hardening becomes complete usually in 5–60 minutes. No cracking forms on the surface of the coating film during hardening. By use of the surface tension reducer the penetration of the hardener solution into the coating film takes place rapidly, so the hardening at the surface and inside of the coating film takes place simultaneously. Therefore, the appearance of stress, which usually appears as a result of the difference in the rate of hardening at the surface and in the coating film, is minimized. So no crack appears in the hardened film.

An example of the surface tension reducer is fluorocarbon sulfonic acid having the following general formula:

$$C_nF_{2n+1}SO_3H$$

wherein $n$ is 1–16, and other examples of surface tension reducers are silicone compounds and their colloidal suspensions having the following general formula:

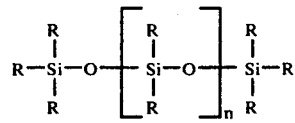

wherein R is methyl or phenyl, and $m$ is 0 to 2230.

As described above in detail, the polymeric silicate is formed by heating a mixture of aqueous alkali silicate solution and amorphous silica powder according to the present invention. The polymeric silicate makes a viscous film-forming material which has particular viscoelastic properties. Consequently, the coating work is made much easier than with conventional inorganic coatings. Since aqueous hardener solutions are used, it is possible to harden the coating at room temperature, and the hardening time is also reduced to a large extent. The addition of surface tension reducer to the hardener solution helps the hardener solution to penetrate into the coating film. Thus, the difference in hardening time between the inside and the surface of the film is minimized and cracks are completely eliminated. The inorganic coating film of the present invention is not only resistant to water, chemicals and solvents, but also has good luster, weather resistance and workability. Most noteworthy is that the coating is non-flammable and smokeless. These characteristics are especially important for coatings to be used for building materials. When the compositions of the present invention are used for the coating and coloring of various building materials, the materials are protected from deteriorating influences exerted by the surroundings. The beautiful external view also adds to the value of the building material. Further, it is possible to give the coated material a texture finish by scattering sand, glass beads, glass flakes, immediately after the painting of the coating compositions of the present invention. After drying to the touch, the coating film is hardened by the treatment with a hardener solution. It is also possible to give the coating multi-colors by spraying coating compositions of different colors. It is also possible to finish the surface with various patterns by printing after the formation of the coating film. Thus the coating compositions of the present invention have various characteristics which could not be expected with conventional inorganic coating compositions.

The compositions of the present invention will now be explained in more detail with practical examples. These examples are easily widely modified by persons skilled in the art of the present invention. Therefore, the present invention is not limited to any extent by these examples. In the following examples, the terms part and percent refer to weight part and weight percent unless otherwise specified.

EXAMPLE 1

To 60 parts of 30% aqueous solution of potassium silicate, in which the molar ratio of silicon dioxide and potassium oxide was 2.4 and whose specific density was 1.273 at 20°C., 15 parts of amorphous silica powder was added. The silica powder was prepared by crushing after melting crystalline silica at 1800°C. and cooling to room temperature (about 30°C.) The particle size of the powder was smaller than 325 mesh. The mixture was charged in a sealed vessel made of stainless steel and heated at 80°C. for 20 hours with stirring. The amorphous silica powder in the mixture gradually dissolved into the solution to give a viscous solution. 15 parts of titanium oxide and 10 parts of mica powder Industrial Standard) A 5410-67, with a spray gun with an orifice diameter of 1.5 mm and at 3 atmospheres pressure to a film thickness of about 100 μ. The coated plates were dried at 80°C. for 30 minutes. The plates thus treated were immersed in hardener solutions X, Y, and Z for 10 minutes, respectively. Performance tests were made after washing the plates with water and then drying. The results were as follows:

| Coating Composition | Hardening Agent | Crack resistance after Treatment | Mohs hardness of coating | Water resistance, 20°C, tap water, immersed for 1 week | Resistance against 30% aqueous NaOH solution | Resistance against hydrochloric acid (spot test, 24 hours) |
|---|---|---|---|---|---|---|
| Example 1 | without treatment | — | 2 – 3 | partly soluble | completely soluble | crack |
|  | hardener X | good | 4 | good | good | good |
|  | hardener Y | excellent | 4 | good | good | good |
|  | hardener Z | crack, all over | 2 – 3 | stripped off | stripped off | stripped off |
| Contrast example | without treatment | — | 1 – 2 | complete disolution | complete dissolution | swelling crack formation |
|  | hardener X | slight crack | 2 | softening | complete dissolution | swelling |
|  | hardener Y | good | 2 | softening | complete dissolution | swelling |
|  | hardener Z | crack, all over | 1 – 2 | stripped off | stripped off | swelling |

(smaller than 200 mesh) were added to the solution and were allowed to disperse for 16 hours in a pebble mill to give a coating composition. On the other hand, a hardener solution (X) was prepared by dissolving 20 parts ammonium persulfate in 80 parts of water. To this hardener, 0.1 part of Fluorard FC-170 (I) (Minnesota Mining Manufacturing Co.) was added as a surface active agent to complete a hardener (Y). A conventional hardener, 3% boric acid solution, was also used as the hardener (Z).

Contrast Example

A conventional alkali silicate coating composition was prepared for comparison with Example 1. 60 parts potassium silicate, 15 parts talc, 15 parts titanium dioxide, and 10 parts mica powder were charged into a pebble mill and were mixed together for 16 hours to obtain a coating composition.

Testing

The coating compositions of the Contrast Example and Example 1 were coated onto asbestos-cement sheets (300 × 10 × 5 mm) specified by JIS (Japanese

EXAMPLES 2-10

As in the case of Example 1, coating compositions of the following ingredients were prepared. In these Examples, the ratio (%) of amorphous silica powder to the solid component in the aqueous alkali silicate solution was 0, 100 or 300 in the case of sodium silicate (Examples 2, 3 and 4). The ratio was 0, 100 or 300 in the case of potassium silicate (Examples 5, 6 and 7). The ratio was 0, 100 or 300 in the case of lithium silicate (Examples 8, 9 and 10). The hardening solution was made by adding 0.1% Fluorard FC-170 to 20% ammonium persulfate as a surface tension reducer. The treatment was the same as with test examples except that the time of immersion was 5 minutes. The characteristics of alkali silicate used in the Examples are shown below for reference. Potassium silicate was the same as that used in Example 1. The molar ratio of silicon dioxide and sodium oxide in the sodium silicate was 2.3. The concentration of the aqueous solution was 54%. The molar ratio of silicon dioxide and lithium oxide in lithium silicate was 3.8. The concentration of the aqueous solution was 28%.

| Example | 2 | 3 | 4 | 5 | 6 | 7 | 8 | 9 | 10 |
|---|---|---|---|---|---|---|---|---|---|
| Alkali silicate | sodium silicate | sodium silicate | sodium silicate | potassium silicate | potassium silicate | potassium silicate | lithium silicate | lithium silicate | lithium silicate |
| Volume % of amourphous silica | 0 | 100 | 300 | 0 | 100 | 300 | 0 | 100 | 300 |
| Crack resistance after | crack, all over | good | good | crack, all over | good | good | crack, all over | good | good |
| Mohs hardness of the film | 2 | 5 | 5 | 2 | 4 | 4 | 2 | 4 | 4 |
| Water resistance (20°C, tap water immersed for 1 week) | complete dissolution | good | good | complete dissolution | good | good | complete dissolution | good | good |
| Resistance against 30% NaOH solution (spot test, | complete dissolution | good | good | complete dissolution | good | good | complete dissolution | good | good |

| Example | 2 | 3 | 4 | 5 | 6 | 7 | 8 | 9 | 10 |
|---|---|---|---|---|---|---|---|---|---|
| 24 hours) Resistance against concentrated hydrochloric acid | crack, all over | good | good | crack, all over | good | good | complete dissolution | good | good |

EXAMPLE 11

The coating composition of Example 1 and hardener solution Y were used. The coating was made onto a birch plywood (300 × 10 × 8 mm) with a spray gun equipped with a nozzle of 1.5 mm diameter under 3 atmospheres pressure to a film thickness of about 100 μ. Immediately after coating, silica powder was scattered all over the coated surface. After drying to the finger touch, the coating was dried for 30 minutes and then immersed in hardener solution Y for 10 minutes to treat the coating. The plate was then washed with water, dried, and finished.

The coated plate showed a surface finish which was hardly flammable and was beautiful and looked like sand tone finish. The characteristics of the coating was as good as that of Example 1.

EXAMPLES 12–19

Tests similar to the test example were made using the coating composition of Example 6 with different hardener solutions. The time of immersion of coated plates into hardener solutions was 5 minutes. All the hardener solutions were aqueous solutions.

1 to 16 and silicone compounds or their colloidal suspension of the formula

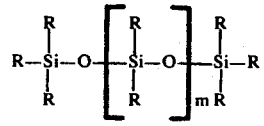

where R is methyl or phenyl and $m$ is zero to 2230; and at least one member selected from the group consisting of phosphoric acid, ammonium phosphate, metal primary phosphate, ammonium chloride, metal chloride, ammonium sulfate, ammonium nitrate, metal nitrate, fluorosilicate, and ammonium persulfate, wherein the metal of said metal chloride is a transition metal or a member of Group II, III or IV of the Periodic Table; wherein the metal of said metal nitrate is a transition metal or a member of Group II, III or IV of the Periodic Table; and wherein said fluorosilicate is a metal hexafluorosilicate and said metal is a member of the group of lead, zinc, calcium, sodium and potassium.

2. The method of claim 1 wherein the amount of said surface tension reducing agent is 0.01–1 percent by weight.

| Example | 12 | 13 | 14 | 15 | 16 | 17 | 18 | 19 |
|---|---|---|---|---|---|---|---|---|
| Hardener solution | 50% phosphoric acid | 20% ammonium nitrate | 20% ammonium chloride | 20% ammonium sulfate | 20% lead hexafluorosilicate | 3% magnesium phosphate, monobasic | 3% magnesium phosphate, monobasic added Fluorard FC-170 (0.1%) | 20% ammonium persulfate, added silicone KM72 (0.1%) |
| Crack resistance after treatment (condition of surface) | good | good | good | good | good | good | excellent | excellent |

Various changes and modifications can be made in the process of products of this invention without departing from the spirit and the scope thereof. The various embodiments set forth herein were for the purpose of further illustrating the invention but were not intended to limit it.

What is claimed is:

1. A method for making an inorganic film-coated article comprising the steps of (a) coating a substrate with a viscous aqueous multicomponent suspension prepared by heating an aqueous suspension comprising 10–50 weight percent alkali silicate and 5–300 weight percent, based on the solids content of said alkali silicate solution, of amorphous silica powder of 0.5–50 micron particle size to above 50°C. with stirring, and (b) hardening the resulting coating by contact with an aqueous solution comprising a surface tension reducing agent selected from the group consisting of fluorcarbon sulfonic acid of the formula $C_nF_{2n+1}SO_3H$ wherein $n$ is 3. The method of claim 1 wherein said metal primary phosphate is of the formula $MiOj.mP_2O_5$ wherein M is a metal of Group I, II or III of the Periodic Table, $i$ is 1 or 2, $j$ is 1–3, and $m$ is 0.25–4.

4. The method of claim 1 wherein said viscous aqueous suspension has a viscosity of 1000 to 15,000 centipoises.

5. The method of claim 1 wherein the molar ratio of silicon dioxide to metal oxide in said alkali silicate is 0.5–15 and wherein the amount of said amorphous silica powder is in the range of 10–170 percent by weight.

6. The method of claim 1 wherein said viscous aqueous multicomponent suspension comprises monomeric silicate ion, polymeric silicate ion micelle, incompletely soluble amorphous silica or its hydrate, and amorphous silica with adsorbed silicate ion.

7. The coated article prepared by the process of claim 1.

* * * * *